(12) United States Patent
Kariya et al.

(10) Patent No.: US 12,496,634 B2
(45) Date of Patent: Dec. 16, 2025

(54) ACTIVE METAL PARTICLE SURFACE MODIFICATION METHOD, AND TITANIUM PARTICLES OR TITANIUM ALLOY PARTICLES

(71) Applicant: OSAKA Titanium technologies Co., Ltd., Hyogo (JP)

(72) Inventors: Shota Kariya, Minoh (JP); Shozo Matsunaga, Amagazaki (JP); Jyunki Okada, Amagazaki (JP)

(73) Assignee: OSAKA TITANIUM TECHNOLOGIES CO., LTD., Hyogo (JP)

( * ) Notice: Subject to any disclaimer, the term of this patent is extended or adjusted under 35 U.S.C. 154(b) by 455 days.

(21) Appl. No.: 17/912,890

(22) PCT Filed: Apr. 9, 2021

(86) PCT No.: PCT/JP2021/014977
§ 371 (c)(1),
(2) Date: Sep. 20, 2022

(87) PCT Pub. No.: WO2021/229965
PCT Pub. Date: Nov. 18, 2021

(65) Prior Publication Data
US 2023/0166326 A1 Jun. 1, 2023

(30) Foreign Application Priority Data
May 13, 2020 (JP) .................................. 2020-084350

(51) Int. Cl.
*B22F 1/00* (2022.01)
*B22F 1/05* (2022.01)
(Continued)

(52) U.S. Cl.
CPC ................ *B22F 1/00* (2013.01); *B22F 1/145* (2022.01); *B22F 1/16* (2022.01); *B22F 1/05* (2022.01);
(Continued)

(58) Field of Classification Search
CPC .... B22F 1/00; B22F 1/145; B22F 1/16; B22F 1/05; B22F 9/082; B22F 2202/01;
(Continued)

(56) References Cited

U.S. PATENT DOCUMENTS

2008/0031766 A1   2/2008   Kogut et al.

FOREIGN PATENT DOCUMENTS

JP          05-78107        3/1993
JP          09-227901       9/1997
(Continued)

OTHER PUBLICATIONS

Zhang et al. ("A solid solution pumping mechanism for the nitrogenation of titanium during mechanical deformation in air." Journal of Physics D: Applied Physics 29.5 (1996): 1367.) (Year: 1996).*

(Continued)

*Primary Examiner* — Ricardo D Morales
(74) *Attorney, Agent, or Firm* — Millen, White, Zelano & Branigan, P.C.; Christopher W. Brody

(57) ABSTRACT

Active metal particles in which the surface layer is hardly oxidized and a method for producing the active metal particles is provided. In the method for modifying the surface of active metal particles, heat is generated by moving active metal powder in a fluid, and the surface layer of the active metal particles is reacted with an arbitrary component in the fluid by the heat to modify the surface layer. Preferably, moving the active metal powder draws a substantially circular orbit while vibrating. A vibrating mill is preferably used when making such movement with respect
(Continued)

to the active metal powder. Then, the powder obtained by the surface modification has a nitrogen-containing coating as a surface layer with a thickness more than 1 nm and less than or equal to 6 nm. The powder has a fluidity in the range of 25 seconds/50 g or more and 45 seconds/50 g or less.

8 Claims, 2 Drawing Sheets

(51) Int. Cl.
  *B22F 1/145* (2022.01)
  *B22F 1/16* (2022.01)
  *B22F 9/08* (2006.01)
(52) U.S. Cl.
  CPC .......... *B22F 9/082* (2013.01); *B22F 2202/01* (2013.01); *B22F 2301/205* (2013.01); *B22F 2302/20* (2013.01)
(58) Field of Classification Search
  CPC .......... B22F 2301/205; B22F 2302/20; B33Y 70/00; C22C 1/0458; C22C 14/00
  See application file for complete search history.

(56) References Cited

FOREIGN PATENT DOCUMENTS

| | | |
|---|---|---|
| JP | 10-204507 | 8/1998 |
| JP | 10-330806 | 12/1998 |
| JP | 2003-129114 | 5/2003 |
| JP | 2003-147454 | 5/2003 |
| JP | 2009-155702 | 7/2009 |
| JP | 2009-287106 | 12/2009 |
| JP | 2019-500503 | 1/2019 |
| JP | 2019-516020 | 6/2019 |
| JP | 2019-183199 | 10/2019 |
| JP | 2020-031145 | 2/2020 |

OTHER PUBLICATIONS

Romankov et al. ("Fabrication of TiN coatings using mechanical milling techniques." International Journal of Refractory Metals and Hard Materials 27.2 (2009): 492-497.) (Year: 2009).*

Knjiro Chie, "Elemental analysis (gas components) methods of metallic materials, etc.", ICC Review, 2009, 4, No. 41.

* cited by examiner

ACTIVE METAL PARTICLE SURFACE MODIFICATION METHOD, AND TITANIUM PARTICLES OR TITANIUM ALLOY PARTICLES

TECHNICAL FIELD

The present invention relates to a method for modifying the surface of active metal particles in an active metal powder. The present invention also relates to titanium particles or titanium alloy particles subjected to surface modification treatment.

BACKGROUND OF THE INVENTION

Titanium and titanium alloys have not only properties of "high specific strength" but also properties such as "high corrosion resistance" and "excellent biocompatibility", but have disadvantages of inferior machinability and plastic workability and high processing cost. For this reason, a lamination molding method or an injection molding method in which a metal part having a three-dimensional complicated shape can be manufactured with a near net shape and a post-processing is hardly required is expected as an effective processing method of titanium and a titanium alloys. With this increase in expectations, there is an increasing demand for titanium powder and titanium alloy powders as raw materials for forming the metal part.

Incidentally, when the active metal powder such as titanium powder or titanium alloy powder is reused in the lamination molding method, the surface layer of the active metal particles in the active metal powder is naturally oxidized at each reuse, and the oxygen concentration of the surface layer increases. When the oxygen concentration exceeds the threshold value, the active metal powder can no longer be used for the lamination molding. For this reason, in order to increase the number of reuses of the active metal powder, the user requires to have an active metal powder containing a large amount of active metal particles having a low oxygen concentration in the surface layer at the time of delivery. On the other hand, in the lamination molding method, an active metal powder having a small particle size is usually required. In general, as the particle size of the active metal powder decreases, the surface layer of the active metal particles in the active metal powder tends to be naturally oxidized, and the amount of oxygen in the surface layer tends to increase with time. Therefore, there is a demand for a technique for inhibiting the natural oxidation of the surface layer of the active metal particles in the active metal powder.

Further, in the injection molding method, in order to obtain a dense sintered body at a low temperature in a short time, reduction of size of pores between the active metal particles at the time of molding is required, the active metal powder containing fine active metal particles is used to satisfy this requirement. As described above, as the particle size of the active metal powder decreases, the surface layer of the active metal particles in the active metal powder tends to be naturally oxidized, and the amount of oxygen in the surface layer tends to increase with time. Therefore, a technique for inhibiting natural oxidation of the surface layer is also required for the active metal particles in the active metal powder used for injection molding.

PRIOR ART DOCUMENT

Patent Document

[PATENT DOCUMENT 1] Japanese Unexamined Patent Application Publication No. 2019-183199

SUMMARY OF THE INVENTION

Problem to be Solved by the Invention

As a method for inhibiting natural oxidation of active metal particles in an active metal powder, for example, covering active metal particles in an active metal powder with a nitride coating is exemplified (see, for example, Japanese Unexamined Patent Application Publication No. 2019-183199). However, the nitrogen-content of the titanium powder or the titanium metal powder is strictly limited by JIS standards and ASTM standards, for example, it is set to 300 ppm in ASTM Grade 23. In addition, the lower the nitrogen content of the active metal particles is, the more preferable it is to maximize the properties of the titanium or titanium alloy. Therefore, when the titanium particles in the titanium powder, and the titanium alloy particles in the titanium alloy powder are covered with a nitride coating as described above, the thickness of the nitride coating is required to be a minimum thickness that exhibits an oxidation inhibiting effect.

An object of the present invention is to provide active metal particles in which not only the surface layer is less likely to be naturally oxidized, but also the active metal powder itself can exhibit characteristics compared with those of the prior art, and a method for producing the active metal particles.

Means for Solving the Problem

The surface modification method of the active metal particles according to the present invention is a method for modifying a surface of active metal particles in the active metal powder. The active metal powder is not particularly limited, but is, for example, a gas atomized active metal powder or the like produced by a gas atomization method. The active metal powder includes titanium powder, titanium alloy powder, and the like. When the active metal powder is a gas atomized active metal powder, the gas used in the production of the active metal powder needs to be a rare gas such as argon gas or other inert gas, that is, a gas that does not substantially react with the surface layer of the active metal particles in the active metal powder. Then, in the surface modification method of the active metal particles, heat is generated by moving the active metal powder in the fluid, the surface layer of the active metal particles in the active metal powder reacts with an arbitrary component in the fluid by the heat, the surface layer is modified. Therefore, the surface layer of the active metal particles in the active metal powder can be an oxidation-inhibiting coating by selecting a reactive fluid suitable for forming an oxidation-inhibiting coating, and the surface layer can be hardly naturally oxidized. Further, in the surface modification method of the active metal particles, it is possible to form a thinner oxidation-inhibiting coating than before by controlling factors such as the degree of movement of the active metal powder, the movement period and the like. Therefore, by using the surface modification method of the active metal particles, it is possible to obtain an active metal powder that not only hardly naturally oxidizes the surface layer, but can exhibit the characteristics of the active metal powder itself as compared with the conventional one.

In the surface modification method of the active metal particles according to the present invention, the active metal powder may be a pure metal powder or an alloy powder. Here, examples of the fluid include a gas, a liquid, nanoparticles and the like. The fluid may consist of only one component or may consist of multiple components. When the fluid consists of multiple components, a dilution component may be included as the component. Further, the movement is not particularly limited as long as the movement generates heat. Such movements include, for example, vibratory movements, reciprocating movements, movements involving collisions, and the like. Also, for such movement relative to such active metal powders, a device that provides velocity to the powder, such as a vibrating mill, planetary mill, jet mill, and the like may be utilized. Among the movements exemplified above, a vibrational motion is more preferable, and a motion of drawing a substantially circular orbit while vibrating is particularly preferable. For the latter movement of the active metal powder, a vibrating mill is preferably used. In the vibration mill, the container into which the active metal powder is charged is subjected to a circular motion while being irradiated with a high frequency. This movement causes the active metal particles in the active metal powder to repeatedly collide with each other inside the container, thereby increasing the sphericity of the active metal particles in the active metal powder. By employing a vibrating mill, such side effects can also be obtained. Here, the substantially circular orbit includes a circular orbit and an elliptical orbit approximating a circle. Also, if the motion is a motion involving a collision, a jet mill may be utilized as a means of causing such motion to take place. The heat is preferably frictional heat.

Meanwhile, as a surface modification method of the active metal particles, a method of adding a reactive gas into an atomizing gas is known. For example, Japanese Unexamined Patent Application Publication (Translation of PCT Application) No. 2019-500503 and Japanese Unexamined Patent Application Publication (Translation of PCT Application) No. 2019-516020 disclose a method of adding an active gas such as oxygen to an atomizing gas. However, when forming a nitride coating on the titanium particles in the titanium powder by the method disclosed in the same publication, since the reaction proceeds at a temperature near the melting point of titanium (1668° C.), the main component of the nitride coating is TiN. Since TiN is susceptible to deterioration, care must be taken in handling in the post-process. Further, in such a case, since the nitrogen atoms easily diffuse into the titanium in the molten state, the nitrogen content of the titanium particles in the finally obtained titanium powder is excessively increased. Further, when forming a nitride coating by heat treatment, nitrogen atoms diffuse into the titanium particles during cooling, disadvantage that the applied nitrogen is not sufficiently contributed to oxidation inhibition occurs. On the other hand, in the surface modification method of the active metal particles according to the present disclosure, since the reactive fluid reacts with the surface layer of the solidified active metal particle at a relatively low temperature, it is presumed that the main component of the nitride coating becomes $Ti_2N$ in addition to the ability to inhibit the inside-diffusion of nitrogen. $Ti_2N$ is less likely to be altered in the atmosphere, so that it does not require special care in handling in the post-process as compared with TiN. In addition, since the volume per nitrogen atom of $Ti_2N$ is about twice as large as that of TiN, a thick coating can be formed even at the same nitrogen content. Therefore, the surface modification method of the active metal particles according to the present invention, it is possible to form an oxidation inhibiting coating superior to the oxidation inhibiting coating obtained by the method of adding a reactive gas to the atomizing gas. In addition, in the surface modification method of the active metal particles, only the surface layer of the active metal particles in the active metal powder is heated, and the inside of the active metal particles is maintained at a lower temperature. Therefore, in the surface modification method of the active metal particles, it is possible to inhibit diffusion of nitrogen into the active metal particles.

The titanium particles or titanium alloy particles according to the present invention have a nitrogen-containing coating as a surface layer. The nitrogen-containing coating has a thickness in a range of more than 1 nm and less than or equal to 6 nm. Therefore, not only the surface layer of the titanium particles or titanium alloy particles is less likely to be naturally oxidized, but also it is possible to exhibit the characteristics of the titanium or titanium alloy itself as compared with the conventional.

The thickness of the nitrogen-containing coating is preferably in the range of more than 1 nm and less than 5 nm, more preferably in the range of more than 1 nm and less than 4 nm, still more preferably in the range of more than 1 nm and less than 3 nm, and particularly preferably in the range of more than 1 nm and less than 2 nm. Here, it is preferable that the nitrogen-containing coating mainly consist of a compound having a composition containing titanium or a compound having a composition containing a titanium alloy composition. Here, in particular, it is preferable that the nitrogen-containing coating mainly consists of a nitride of titanium or a nitride of a titanium alloy. Examples of the nitride of titanium include $Ti_2N$, TiN and the like. For the reasons mentioned above, the nitrogen-containing coating is preferably composed mainly of $Ti_2N$ ($Ti_2N$ and TiNs can be identified by X-ray photoelectron spectroscopy (XPS)). The nitrogen-containing coating preferably contains a metal oxide. Further, the sphericity of each particle in the titanium powder or titanium alloy powder is preferably within a range of 0.8 or more and 1.0 or less. The titanium powder or the titanium alloy powder preferably has a 50% average particle diameter (median diameter) in a range of 10 μm or more and 120 μm or less, and more preferably in a range of 10 μm or more and 40 μm or less (the median diameter can be measured by a particle size distribution measuring apparatus). When the 50% average particle diameter (median diameter) of the titanium powder or the titanium alloy powder is in the range of 10 μm or more and 120 μm or less, a sufficient natural oxidation inhibiting effect can be exhibited in the lamination molding method or the injection molding method, and when the 50% average particle diameter (median diameter) is in the range of 10 μm or more and 40 μm or less, a particularly large natural oxidation inhibiting effect can be exhibited. The titanium powder or the titanium alloy powder preferably has a fluidity of 25 seconds/50 g or more and 45 seconds/50 g or less. Further, it is preferable that the titanium particles or titanium alloy particles according to the present invention indicates 130 ppm or less of the oxygen increase amount when heated for 4 hours at 60° C. in air.

Fine titanium powder and fine titanium alloy powder having a particle size of 20 μm or less are classified as flammable solids of the second class of fire defense law dangerous materials because they ignite and continue to burn within 10 seconds in a small gas flame ignition test, and therefore, not only are they limited in the specified quantity for storage and handling, but also high safety measures are required by the manufacturing and handling operations. However, it was revealed that the titanium powder or the titanium alloy powder classified by the particle size of 20 μm (that is, the titanium powder or the titanium alloy powder having the particle size of 20 μm or less) does not ignite in the small gas flame ignition test. For this reason, the titanium powder or titanium alloy powder mentioned above does not suffer from the above-mentioned limitations or does not need to satisfy the above-mentioned requirements.

MODE FOR CARRYING OUT THE INVENTION

Hereinafter, working examples and comparative examples are shown in order to explain the present invention in more detail, but the present invention is not limited to these working examples.

Working Example 1

1. Preparation of Ti-6Al-4V Powder

First, a Ti-6Al-4V powder (hereinafter referred to as "titanium alloy powder") was prepared by a gas atomization method disclosed in Japanese Unexamined Patent Application Publication No. H10-204507, and the titanium alloy powder was collected in a mill-pot (MB-1 manufactured by CHUO KAKOHKI CO. LTD.) having an internal volume of 3.4 L in an argon-atmosphere. Next, the inside of the mill pot was replaced with nitrogen, and then the mill pot was set in a vibrating mill (MB-1 manufactured by CHUO KAKOHKI CO. LTD.). Then, the vibration mill was operated for 90 minutes under the condition of a frequency of 1200 rpm, the vibration-crushing process was performed on the titanium alloy powder. Thereafter, the titanium alloy powder after the vibration-crushing process was classified according to the method described in JIS K 0069 using a sieve net having a mesh size of 20 μm and 45 μm, thereby obtaining a titanium alloy powder having a particle size of 20 μm to 45 μm of the purpose. The titanium alloy powder having a particle size of 20 μm or less was subjected to a small gas flame ignition test.

2. Measurement of Physical Properties of Titanium Alloy Powder (1) Measurement of Oxygen and Nitrogen Content The oxygen content and nitrogen content of the titanium alloy powder having a particle size of 20 μm to 45 μm obtained as described above was measured according to the methods described in JIS H1620 and JIS H 1612, and the oxygen content was 680 ppm and the nitrogen content was 160 ppm.

(2) Measurement of Nitride Coating Thickness
(2-1)

Figure 1:
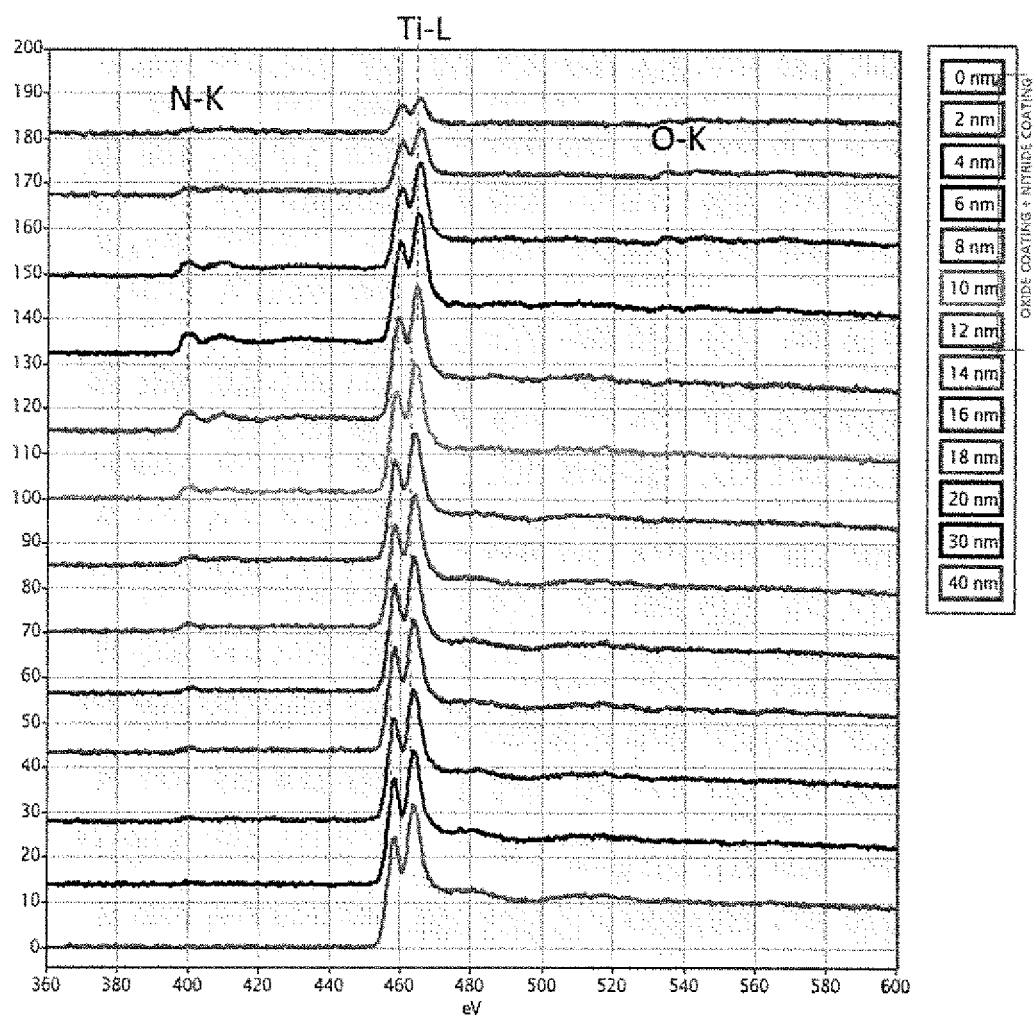
FIG. 1 It is a diagram showing an example of EELS lines used in measuring the nitride coating thickness in the titanium alloy particles in the titanium alloy powder according to working examples and comparative examples.
Figure 2:
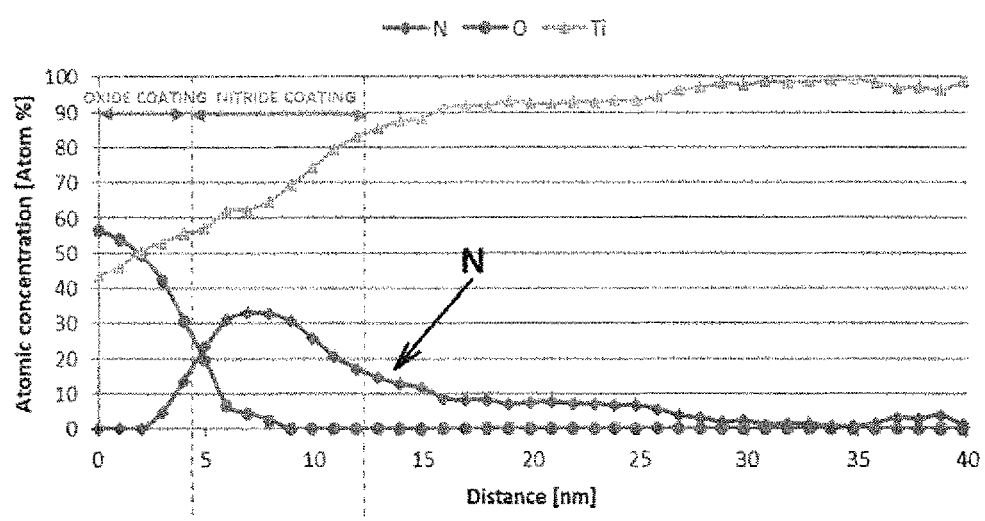
FIG. 2 It is a diagram showing an example of an element concentration profile used in measuring the nitride coating thickness in the titanium alloy particles in the titanium alloy powder according to working examples and comparative examples.

The titanium alloy powder having a particle size of 20 μm to 45 μm obtained as described above was processed into a plate-shaped section having a thickness of 100 nm using a focused ion beam (FIB) apparatus. Then, the section was set in a transmission electron microscope (TEM) (JEM-2100F manufactured by JEOL Ltd.), and electron beam energy-loss spectroscopy (EELS) analysis was performed while increasing the measured depth by 2 nm for a TEM image of 1 million times the section to obtain a EELS line as shown in FIG. 1. Then, the element concentration profile shown in FIG. 2 was obtained from this EELS line (Note that the element concentration profile in the FIG. 1 was merely exemplary.). As shown in the FIG. 1, in this elemental concentration profile, the titanium concentration, the oxygen concentration and the nitrogen concentration are plotted against the measured depth (the titanium concentration was based on the intensity at 454 eV (Ti-2p), the nitrogen concentration was based on the intensity at 397 eV (N-1s), the oxygen concentration was based on the intensity at 530 eV (O-1s)). Then, the difference in the measured depth of two points corresponding to the half value of the maximum nitrogen concentration value in the nitrogen concentration curve of the element concentration profile was measured, and the difference was defined as the coating thickness of the nitride coating. The thickness of the nitride coating of the titanium alloy particles in the titanium alloy powder was 4 nm. Further, it was clarified from the above-described element concentration profile that an oxide coating of 4 nm was formed on the nitride coating.

(3) Fluidity Measurement

The fluidity of the titanium-alloy powder having a particle size of 20 μm to 45 μm obtained as described above was measured based on "JIS Z2502:2012 Metal Powder-Fluidity Measuring Methods", and the fluidity was 31.9 sec/50 g.

(4) Small Gas Flame Ignition Test

When a small gas flame ignition test (Fire service act second class hazardous substance test) was performed on each of a titanium alloy powder having a particle size of 20 μm to 45 μm and a titanium alloy powder having a particle size of 20 μm or less, none of the titanium alloy powders ignited.

Working Example 2

1. Preparation of Ti-6Al-4V Powder

First, a Ti-6Al-4V powder (hereinafter referred to as "titanium alloy powder") was prepared by a gas atomization method disclosed in Japanese Unexamined Patent Application Publication No. H10-204507, and the titanium alloy powder was transferred to a mill pot of a vibrating mill (FV-20 manufactured by CHUO KAKOHKI CO. LTD.) in an argon-atmosphere. Next, after replacing the inside of the mill pot with argon, the vibration mill was operated for 118 minutes under the condition of a frequency of 1200 rpm (at this time, in order to prevent the change in the reaction rate due to the temperature change during the surface treatment, the temperature adjustment was carried out so that the temperature of the entire powder was constant). Thereafter, the nitrogen gas was rapidly charged into the inside of the mill pot, and the same vibration mill was operated again under the same conditions for 2 minutes. Then, the titanium alloy powder in the mill pot was classified into three fractions having a particle size of 20 μm to 45 μm, a particle size of 45 to 105 μm, and a particle size of 15 μm to 52 μm according to the methods described in JIS K 0069 using a sieve net to obtain a titanium alloy powder of the purpose.

2. Measurement of Physical Properties of Titanium Alloy Powder (1) Measurement of Oxygen and Nitrogen Content The oxygen content and nitrogen content of the titanium alloy powder having a particle size of 20 µm to 45 µm was measured according to the same method as that shown in the working example 1, and the oxygen content was 700 ppm and the nitrogen content was 130 ppm.

(2) Measurement of Nitride Coating Thickness

Titanium alloy particles in a titanium alloy powder having a particle size of 20 µm to 45 µm, titanium alloy particles in a titanium alloy powder having a particle size of 45 to 105 µm, and titanium alloy particles in a titanium alloy powder having a particle size of 15 urn to 52 µm were measured according to the same method as that shown in the working example 1, and the nitride coating thickness of titanium alloy particles in any titanium alloy powder was 1 nm.

(3) Fluidity Measurement

The fluidity of the titanium alloy powder having a particle size of 20 µm to 45 µm was measured according to the same method as that shown in the working example 1, and the fluidity was 37.3 sec/50 g.

Working Example 3

1. Preparation of Ti-6Al-4V Powder

Except that the first operation period of the vibration mill was replaced with 30 minutes and the second operation period of the same vibration mill was replaced with 5 minutes, a titanium alloy powder of the purpose was obtained in the same manufacturing method as the manufacturing method of the titanium alloy powder shown in the working example 2.

2. Measurement of Physical Properties of Titanium Alloy Powder (1) Measurement of Oxygen and Nitrogen Content The oxygen content and nitrogen content of the titanium alloy powder having a particle size of 20 µm to 45 µm was measured according to the same method as that shown in the working example 1, and the oxygen content was 660 ppm and the nitrogen content was 170 ppm.

(2) Measurement of Nitride Coating Thickness

The thickness of the nitride coating of the titanium alloy particles in the titanium alloy powder having a particle size of 20 µm to 45 µm was measured according to the same method as that shown in the working example 1, and the thickness was 3 nm.

(3) Fluidity Measurement

The fluidity of the titanium alloy powder having a particle size of 20 µm to 45 µm was measured according to the same method as that shown in the working example 1, and the fluidity was 35.3 sec/50 g.

Working Example 4

1. Preparation of Ti-6Al-4V Powder

Except that the first operation period of the vibration mill was replaced with 105 minutes, the second operation period of the same vibration mill was replaced with 15 minutes, a titanium alloy powder of the purpose was obtained in the same manufacturing method as the manufacturing method of the titanium alloy powder shown in the working example 2.

2. Measurement of Physical Properties of Titanium Alloy Powder (1) Measurement of Oxygen and Nitrogen Content The oxygen content and nitrogen content of the titanium alloy powder having a particle size of 20 µm to 45 µm was measured according to the same method as that shown in the working example 1, and the oxygen content was 690 ppm and the nitrogen content was 250 ppm.

(2) Measurement of Nitride Coating Thickness

The thickness of the nitride coating of the titanium alloy particles in the titanium alloy powder having a particle size of 20 µm to 45 µm was measured according to the same method as that shown in the working example 1, and the thickness was 6 nm.

(3) Fluidity Measurement

The fluidity of the titanium alloy powder having a particle size of 20 µm to 45 µm was measured according to the same method as that shown in the working example 1, and the fluidity was 33.3 sec/50 g.

Comparative Example 1

1. Preparation of Ti-6Al-4V Powder

A Ti-6Al-4V powder (hereinafter referred to as "titanium alloy powder") was prepared by the gas atomization method disclosed in Japanese Unexamined Patent Application Publication No. H10-204507, and the obtained titanium alloy powder was classified according to the method described in JIS K 0069 using a sieve net having a mesh size of 20 µm and 45 µm, thereby obtaining a titanium alloy powder having a particle size of 20 µm to 45 µm of the purpose. The titanium alloy powder having a particle size of 20 µm or less was subjected to a small gas flame ignition test.

2. Measurement of Physical Properties of Titanium Alloy Powder (1) Measurement of Oxygen and Nitrogen Content The oxygen content and nitrogen content of the titanium alloy powder having a particle size of 20 µm to 45 µm was measured according to the same method as that shown in the working example 1, and the oxygen content was 790 ppm and the nitrogen content was 30 ppm.

(2) Measurement of Nitride Coating Thickness

The thickness of the nitride coating of the titanium alloy particles in the titanium alloy powder having a particle size of 20 µm to 45 µm was measured according to the same method as that shown in the working example 1, and the thickness of the titanium alloy powder was 0 nm.

(3) Fluidity Measurement

The fluidity of the titanium alloy powder having a particle size of 20 µm to 45 µm was measured according to the same method as that shown in the working example 1, and the titanium alloy powder did not flow.

(4) Small Gas Flame Ignition Test

A small gas flame ignition test (Fire service act second class dangerous substance test) was performed on a titanium alloy powder having a particle size of 20 µm or less according to the same method as that shown in the working example 1, and the titanium alloy powder was ignited.

Comparative Example 2

1. Preparation of Ti-6Al-4V Powder

A Ti-6Al-4V powder (hereinafter referred to as "titanium alloy powder") was prepared by a gas atomization method disclosed in Japanese Unexamined Patent Application Publication No. H10-204507, and the titanium alloy powder was collected in a mill-pot (MB-1 manufactured by CHUO KAKOHKI CO. LTD.) having an internal volume of 3.4 L in an open atmosphere. Next, the mill pot was set in a vibration mill (MB-1 manufactured by CHUO KAKOHKI CO. LTD.), and the vibration mill was operated at a frequency of 1200 rpm for 90 minutes to perform a vibration crushing process on the titanium-alloy powder. Thereafter, the titanium alloy powder after the vibration-crushing process was classified according to the method described in JIS K 0069 using a sieve net having a mesh size of 20 μm and 45 μm, thereby obtaining a titanium alloy powder having a particle size of 20 μm to 45 μm of the purpose. The titanium alloy powder having a particle size of 20 μm or less was subjected to a small gas flame ignition test.

2. Measurement of Physical Properties of Titanium Alloy Powder (1) Measurement of Oxygen and Nitrogen Content The oxygen content and nitrogen content of the titanium alloy powder having a particle size of 20 μm to 45 μm was measured according to the same method as that shown in the working example 1, and the oxygen content was 1080 ppm and the nitrogen content was 50 ppm.

(2) Measurement of Nitride Coating Thickness

The thickness of the nitride coating of the titanium particles in the titanium alloy powder having a particle size of 20 μm to 45 μm was measured according to the same method as that shown in the working example 1, and the thickness of the nitride coating was 0 nm.

(3) Fluidity Measurement

The fluidity of the titanium alloy powder having a particle size of 20 μm to 45 μm was measured according to the same method as that shown in the working example 1, and the fluidity was 32.4 sec/50 g.

(4) Small Gas Flame Ignition Test

A small gas flame ignition test (Fire service act second class dangerous substance test) was performed on a titanium alloy powder having a particle size of 20 μm or less according to the same method as that shown in the working example 1, and the titanium alloy powder was ignited.

The results obtained in the working examples 1-4 and the comparative examples 1-3 are summarized in Table 1 below.

the oxidation of the titanium alloy powder, it is expected to be able to effectively inhibit the increase in the oxygen content during recycling of the titanium alloy powder used for lamination molding.

SUMMARY

As is apparent from Table 1, the titanium alloy powders according to the working examples 1-4 have a higher nitrogen content than the titanium alloy powders according to the comparative examples 1 and 2, and the titanium alloy particles are covered with a nitride coating of several nm. Therefore, the titanium alloy powders according to the working examples 1-4 are less likely to be oxidized. Incidentally, the titanium alloy powders according to the working examples 1-4 contained oxygen of 650-700 ppm, this is because 400 ppm of oxygen that the titanium alloy powder originally had, and 300 ppm of oxygen added as an oxide coating is considered to have been combined. In addition, the titanium alloy powders of 20 μm to 45 μm according to the working examples 1 to 4 exhibits high fluidity, and can be applied to the lamination molding method. Furthermore, the titanium alloy powders according to the working examples 1-4 does not ignite in the small gas flame ignition test (Fire service act second class dangerous substance test) even when the particle size becomes 20 μm or less. Therefore, the titanium alloy powders according to the working examples 1-4 can be handled with ordinary attention. The titanium alloy powders according to the working examples 1-4 has the above-described properties, and is not previously present.

The thickness of the nitride coating of the titanium alloy powders according to the working examples 1-4 substantially matches the theoretical value obtained from the following Formula (I), and is about twice the theoretical value

TABLE 1

| | particle size (μm) | oxygen content (ppm) | nitrogen content (ppm) | nitride coating thickness (nm) | Fluidity (second/50 g) | Small gas flame ignition test |
|---|---|---|---|---|---|---|
| Working example 1 | 20-45 | 680 | 160 | 4 | 31.9 | Not ignited |
| | -20 | — | — | — | — | Not ignited |
| | 20-45 | 700 | 130 | 1 | 37.3 | — |
| Working example 2 | 45-105 | — | — | 1 | — | — |
| | 15-52 | — | — | 1 | — | — |
| Working example 3 | 20-45 | 660 | 170 | 3 | 35.3 | — |
| Working example 4 | 20-45 | 690 | 250 | 6 | 33.3 | — |
| Comparative example 1 | 20-45 | 790 | 30 | 0 | Not flowed | — |
| | -20 | — | — | — | — | ignited |
| Comparative example 2 | 20-45 | 1080 | 50 | 0 | 32.4 | — |
| | -20 | — | — | — | — | ignited |

Working Example 5

The titanium alloy powder prepared in the working example 3 and the titanium alloy powder prepared in the comparative Example 2 were heated at 60° C. for 4 hours respectively, to verify the antioxidant effect of the nitride coating. As a result, in the titanium alloy powder prepared in the comparative example 2, the oxygen content was increased by 160 ppm, whereas in the titanium alloy powder prepared in the working example 3, the oxygen content was increased only by 130 ppm, and the oxygen increase was decreased by 20% compared to the titanium alloy powder prepared in the comparative example 2. From this result, the formation of the nitride coating was effective in inhibiting obtained from the following Formula (II). Therefore, it is presumed that the nitride coating of the titanium-alloy powders according to the working examples 1-4 is mainly formed of $Ti_2N$.

$$d = \tfrac{1}{3}\Delta C_N (d_{50}/2)(M_{Ti_2N}/M_N)(\rho_{Ti}/\rho_{Ti_2N}) \qquad (I)$$

$$d = \tfrac{1}{3}\Delta C_N (d_{50}/2)(M_{TiN}/M_N)(\rho_{Ti}/\rho_{TiN}) \qquad (II)$$

In the two formulae (I) and (II), "d" is the thickness of the nitride coating, "$\Delta C_N$" is the increased amount of nitrogen content with respect to the untreated powder, "$d_{50}$" is the median diameter (50% particle diameter) of the titanium alloy powder, "$M_{Ti_2N}$" is the molecular weight of $Ti_2N$, "$M_{TiN}$" is the molecular weight of TiN, "$M_N$" is the atomic weight of N, "$\rho_{Ti}$" is the density of Ti, "$\rho_{Ti2N}$" is the density of Ti$_2$N, and "$\rho_{TiN}$" is the density of TiN.

The invention claimed is:

1. A method for forming a coating on a surface of active metal particles, comprising:
   generating heat by moving an active metal powder in a fluid; and
   reacting a surface layer of active metal particles in the active metal powder with an arbitrary component in the fluid under an inert gas atmosphere by the heat to form a coating on the surface layer.

2. The method for forming the coating on the surface of the active metal particles according to claim 1, wherein a driving force for moving the active metal powder is vibration.

3. The method for forming the coating on the surface of the active metal particles according to claim 1, wherein moving the active metal powder is moving the active metal powder drawing a substantially circular orbit while vibrating.

4. The method for forming the coating on the surface of the active metal particles according to claim 1, wherein moving the active metal powder is moving the active metal powder for a collision of the active metal particles.

5. The method for forming the coating on the surface of the active metal particles according to claim 1, wherein the heat is frictional heat.

6. The method for forming the coating on the surface of the active metal particles according to claim 1, wherein the fluid includes nitrogen gas.

7. The method for forming the coating on the surface of the active metal particles according to claim 1, wherein the coating is mainly composed of Ti$_2$N.

8. The method for forming the coating on the surface of the active metal particles according to claim 1, wherein a thickness of the coating is in a range from greater than 1 nm to 6 nm.

* * * * *